July 10, 1934.   J. F. McNAIR   1,966,128
BURR CUTTING ATTACHMENT FOR ADJUSTABLE PIPE DIE STOCKS
Filed Feb. 10, 1933

INVENTOR.
John F. McNair.
BY Henry L. Chenery
Attorney.

Patented July 10, 1934

1,966,128

UNITED STATES PATENT OFFICE 1,966,128

BURR-CUTTING ATTACHMENT FOR ADJUSTABLE PIPE DIE STOCKS

John F. McNair, Westbrook, Maine

Application February 10, 1933, Serial No. 656,178

1 Claim. (Cl. 77—73)

The invention which will hereinafter be described relates to equipment for pipe threading tools, particularly that type commonly designated as adjustable die stocks by means of which screw thread may be cut on various sizes of pipe by simply re-locating the dies radially of the stock or die holder.

In cutting pipe to any required length it is customary practice to employ a rotary cutter. This leaves a burr on the inside of the pipe, at the cutting point, which greatly reduces the effective area and capacity of the pipe and frequently results in causing a plugging of the pipe line by an accumulation of foreign matter which cannot pass the obstruction.

The primary object of my present invention is to provide means whereby this burr or ridge around the inside of the pipe may be removed simultaneously with the cutting of the thread on the pipe.

To this end I employ a cutter or reamer and mount it on the die stock in intimate association with one of the dies, so that, when adjusting the dies to operate on any particular size of pipe the burr-cutting tool will automatically be positioned to perform its duty without resort to independent adjustment. In other words, when the dies are moved, the cutter moves also to operate on any of the sizes of pipe within the range of the die stock—as for instance, one inch, one and one-quarter inch, one and one-half inch and two inches, which is a quite common range on commercial die stocks for cutting thread on pipe.

I do, however, provide means for making a slight adjustment, relatively, of the die and cutter to take care of the requirement met with when pipe of either thicker or thinner wall than standard is being threaded.

A further object is to mount the cutter-supporting element so that when it is desired to cut a longer thread than ordinarily is required the cutter elements may be withdrawn, after clearing the burr from the pipe, permitting the pipe to protrude through the die stock any distance desired.

As I am not particularly concerned, in the present invention, with the thread-cutting elements, per se, except as will be hereinafter explained, I have shown them in the drawing in sufficient detail only as will comprehensively connect and illustrate the co-relation of the threading and reaming elements; my reamer or burr-cutting apparatus may be mounted on any die stock having radially adjusting dies for threading a plurality of various sizes of pipe.

The character of the invention may best be understood by reference to the description found in the following specification when taken in connection with the accompanying drawing in which is disclosed an embodiment which, at the present time, I consider preferable to other possible forms in which the invention might be carried out.

In the drawing,—

Similar reference characters are employed to identify like parts in all views of the drawing.

Figure 1:
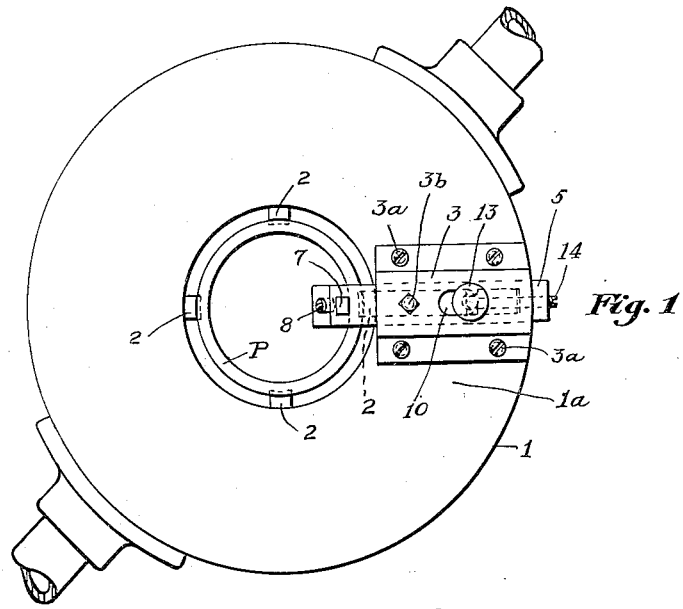
Fig. 1 is a plan view of an adjustable die stock equipped with my invention.

Referring to the drawing, 1 represents the body portion of any adjustable die stock for threading pipe of various sizes, and 2, 2, are the dies therefor.

In the different designs of commercial die stocks there are various ways and methods of automatically bringing the dies into radial positions in which, respectively, the different sizes of pipe within the capacity of the die stock may be screw-threaded. In the present invention this feature is not shown, as it is not material to my invention, except as will be hereinafter explained. My burr-removing attachment is applicable to any make of adjustable die stock.

On the end surface 1a of the stock 1 is a tool bar holder 3, secured to the stock by the screws 3a. Within this holder is a longitudinal channel 4 slidably mounted in which is a tool bar 5 having on its inner end a cutting tool receiving aperture 6 within which is secured the cutting tool 7 held in place therein by the set screw 8.

Through the end of the stock 1 is a slot 9 and in the tool bar holder 3 is made a similar slot 10. A transverse groove 11 is cut on the face of the die 2, and in this groove operates the eccentric pintle 12 integral with the pin 13, the latter passing through the slots 9 and 10 and adapted to be rotated into various circumferential positions in the tool bar 5. A set screw 14 secures the pin 13 in any position, circumferentially, in the hole 13a in the member 5.

The cutting tool operates as follows: The dies are first run on to the pipe for a few threads before the end of the cutter contacts with the burred end of the pipe. As the threading operation proceeds the cutter is drawn into the burr and by the time the regulation length of thread is cut has completely removed the obstruction from the inside of the pipe, leaving it smooth and of full size diameter.

Figure 6:
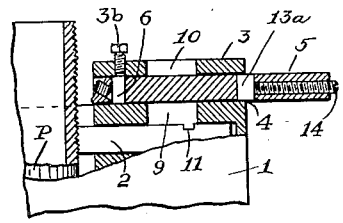
Fig. 6 illustrates the die stock operating to cut a long thread on the pipe, the cutter and its supporting member being withdrawn to permit the pipe to project at some distance through the die stock.

On certain occasions it may be required to cut a long thread on the pipe. In this case the screws 8 and 14 are relaxed and the cutter 7 and the pin 13 removed, after which the bar 5 may be withdrawn sufficiently to permit of the pipe passing outwardly through the stock as the thread is being cut. Figure 6 illustrates this feature.

Figure 2:
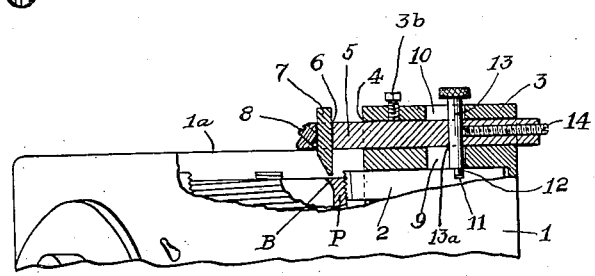
Fig. 2 is a fragmentary side elevation thereof, partly in section, the cutter as yet not having entered the pipe.
Figure 3:
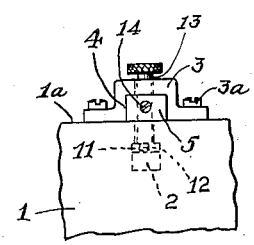
Fig. 3 is an end view of the cutter-supporting elements.
Figure 4:
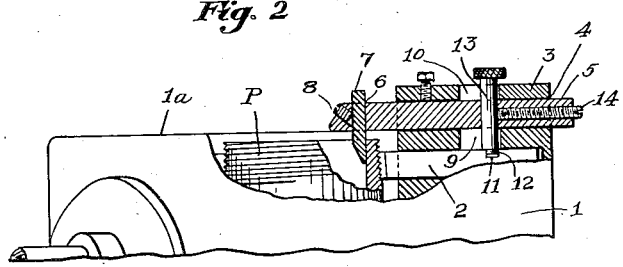
Fig. 4 is the same as Fig. 2, except that the cutter is shown after having removed the burr.
Figure 5:
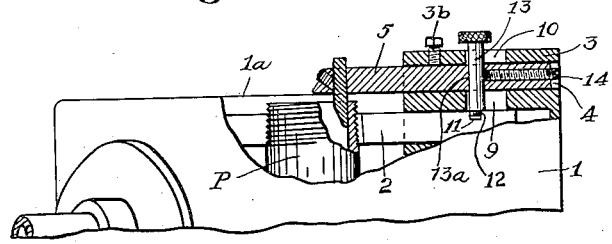
Fig. 5 shows the die and cutter operating on a pipe smaller in size than that shown in Figs. 2 and 4.

Figs. 2 and 4 show pipe of the largest size of which the die stock is capable of handling. In Fig. 5 a smaller size is being threaded, and this pipe is also of a less thickness than that shown in Figs. 2 and 4.

The dies are adjusted by whatever arrangement the particular die stock being used employs for this purpose, but in all cases as the dies move inwardly or outwardly, to accommodate themselves to smaller or larger sizes, respectively, of pipe, the bar 5 moves accordingly through the agency of the pin 13.

A set screw 3b, used to more firmly secure the tool bar 5 in the holder 3 when very heavy burrs are to be cut, is relaxed when the dies are adjusted to cut different sizes of pipe.

When cutting pipe which is of either thicker or thinner wall than ordinary, a slight further adjustment, relatively, between the die and burr-cutting tool becomes necessary.

This is accomplished by relaxing the screw 14 and rotating the pin 13 which in turn rotates the eccentrically disposed pintle 12 to bring the burr-cutting tool 7 to the proper position to align with the inner side of the wall of the pipe—the tool bar 5 either advancing or retracting in the holder 3, and the space between the burr-cutting tool and the end of the die either increased or decreased accordingly.

Fig. 5 illustrates the position of the parts when operating on pipe of smaller diameter than that shown in Figs. 2 and 4, and also of thinner wall. It will be observed that the pin 13 is at the opposite end of the slots 9 and 10 from that in which it is shown in Fig. 4, and further, that the eccentric pintle 12 is disposed in opposite relation to its former position in order that the burr-cutting tool may be brought closer to the end of the die to accommodate itself to the thinner pipe.

The device is simple in construction and effective in operation, and a feature which readily commends itself to those engaged in pipe-threading operations of any kind, and particularly to those who must pay the bills for the work is that, when a die stock is equipped with this invention, no piece of pipe can be threaded except at the same time its interior surface adjacent the end of the pipe has been cleared of obstructive burrs and brought to a full size dimension before it is installed in a pipe line.

This largely eliminates the cause which results in the necessity of replacements in pipe installations, due in a great measure to neglect on the part of the workman to remove the burr from the ends of the pipe, thereby reducing the effective area of its inside to such an extent that the flow of water is slackened and deposits accumulate on the inside surface of the pipe until finally the pipe line is required to be replaced by new pipe.

The old method of performing the thread-cutting and reaming in two separate, distinct operations gives the workman an opportunity to neglect one of them—the reaming, whereas in the method employed and the apparatus used as embodied in the present invention, a safeguard is provided against either intentionally or accidentally slighting his duty.

Where a large variety of sizes of pipe threading work is to be done, the adjustable die stock is of superior advantage and convenience, especially when the work is to be performed at the place of installing the pipe lines; and by arranging the parts so that the burr cutter and dies are closely associated much time and labor can be saved in making adjustments to the different sizes of pipe.

What I claim is:

In a burr-cutting attachment for pipe die stocks having a plurality of radially adjustable dies, comprising a tool-carrying bar, a burr-cutting tool in the inner end of said bar, a tool-carrying bar holder on the end of said stock abreast of one of said dies, a slot in the end of said stock, a slot in said bar holder aligning with the slot in said stock, a pin secured in said tool bar and operable within the two aforesaid slots, a transverse groove on the adjacent side of said die, a pintle eccentrically disposed on and integral with said pin, adapted to engage said groove whereby upon rotating said pin a longitudinal movement, relatively, between said tool bar and said die may be had, and means to release said burr-cutting tool and said pin to the end that said tool bar may be withdrawn sufficiently to permit the pipe being screw-threaded in said stock to pass outwardly therethrough.

JOHN F. McNAIR.